United States Patent
Tilanus et al.

(10) Patent No.: US 6,731,742 B1
(45) Date of Patent: May 4, 2004

(54) MEDIATION OF TRAFFIC IN AN INTELLIGENT NETWORK

(75) Inventors: Paulus Anthonius Josephus Tilanus, Voorschoten (NL); Herman Johannes Barnard, Rijnsburg (NL)

(73) Assignee: Koninklijke KPN N.V., Groningen (NL)

( * ) Notice: Subject to any disclaimer, the term of this patent is extended or adjusted under 35 U.S.C. 154(b) by 0 days.

(21) Appl. No.: 09/807,552

(22) PCT Filed: Oct. 7, 1999

(86) PCT No.: PCT/EP99/07771

§ 371 (c)(1),
(2), (4) Date: Jun. 12, 2001

(87) PCT Pub. No.: WO00/31985

PCT Pub. Date: Jun. 2, 2000

(30) Foreign Application Priority Data

Nov. 23, 1998 (NL) .............................................. 1010625

(51) Int. Cl.[7] .............................................. H04M 7/00
(52) U.S. Cl. .............................. 379/221.08; 379/221.11
(58) Field of Search ...................... 379/221.08, 221.11, 379/201.01

(56) References Cited

U.S. PATENT DOCUMENTS

| | | | | |
|---|---|---|---|---|
| 5,430,719 A | | 5/1995 | Weisser, Jr. ................. | 370/58.2 |
| 5,701,301 A | | 12/1997 | Weisser, Jr. ................. | 370/428 |
| 6,459,788 B1 | * | 10/2002 | Khuc et al. ............ | 379/265.09 |
| 6,473,505 B1 | * | 10/2002 | Khuc et al. ............ | 379/265.01 |

FOREIGN PATENT DOCUMENTS

| | | |
|---|---|---|
| EP | 0 726 682 | 8/1996 |
| WO | WO 98/46030 | 10/1998 |

OTHER PUBLICATIONS

J. Cheng et al, "Open AIN Operations Strategies", IEEE Proceedings of the Network Operations and Management Symposium (Nom, Kissimmee), vol. 1, No. SYMP. 4, Feb. 4–17, 1994, pp. 140–152.

* cited by examiner

Primary Examiner—Ahmad F. Matar
Assistant Examiner—Rasha S Al-Aubaidi
(74) Attorney, Agent, or Firm—Michaelson & Associates; Peter L. Michaelson

(57) ABSTRACT

An infrastructure for telephony is described, comprising a network (n) and a service provider (SP) coupled thereto. The network comprises a service switching function ($SSF^N$) as well as a service control function ($SCF^N$) for controlling said service switching function. The service provider comprises a service switching function ($SSF^S$) as well as a service control function ($SCF^S$) for controlling said service switching means. The service provider comprises an inter-working unit (IWU). In communication with a service switching function ($SSF^S$) of the service provider, the inter-working unit (IWU) behaves as service control function. In communication with a service control function ($SCF^S$) of the service provider, the inter-working unit (IWU) behaves as service switching function. In communication with the network, the inter-working unit (IWU) behaves as special resource point (SRP).

9 Claims, 5 Drawing Sheets

MEDIATION OF TRAFFIC IN AN INTELLIGENT NETWORK

Figure 1:
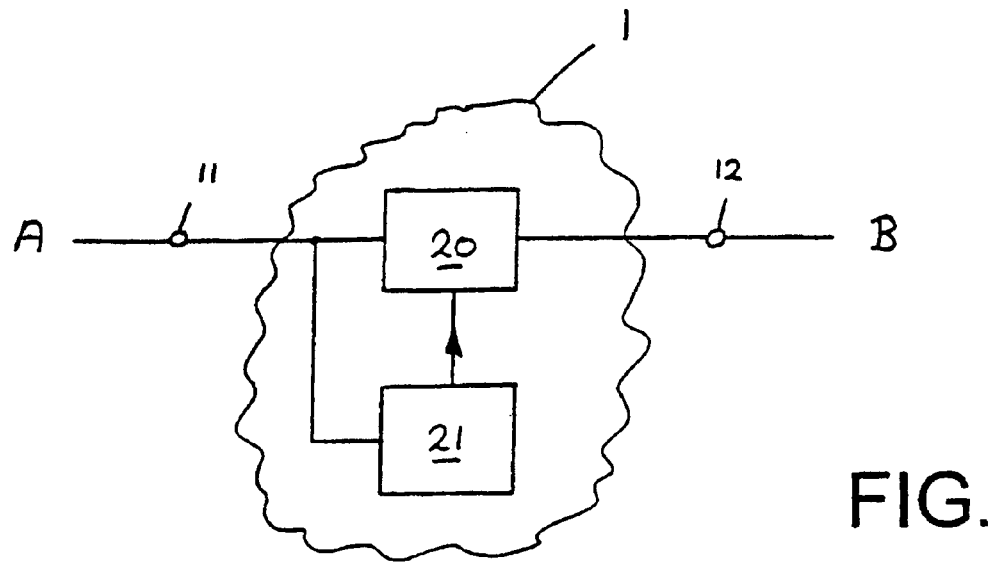

In general, the present invention is related to an infrastructure for data transmission, in particular an infrastructure for communication.

Figure 2:
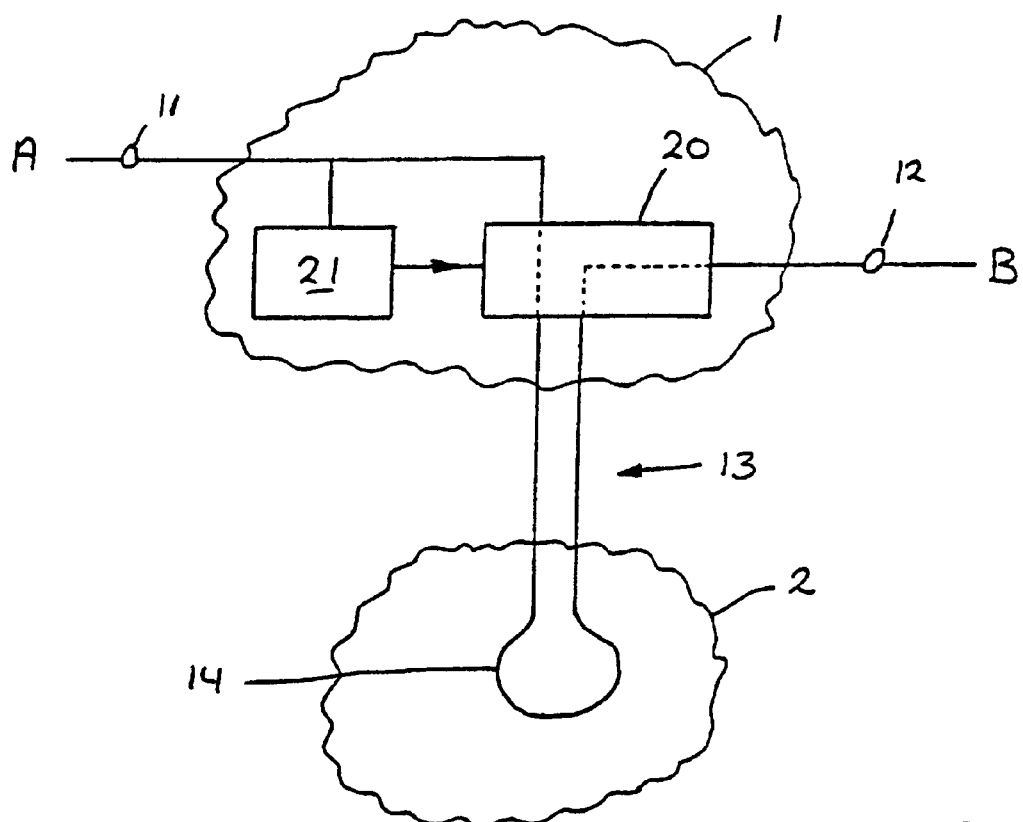
Figure 3:
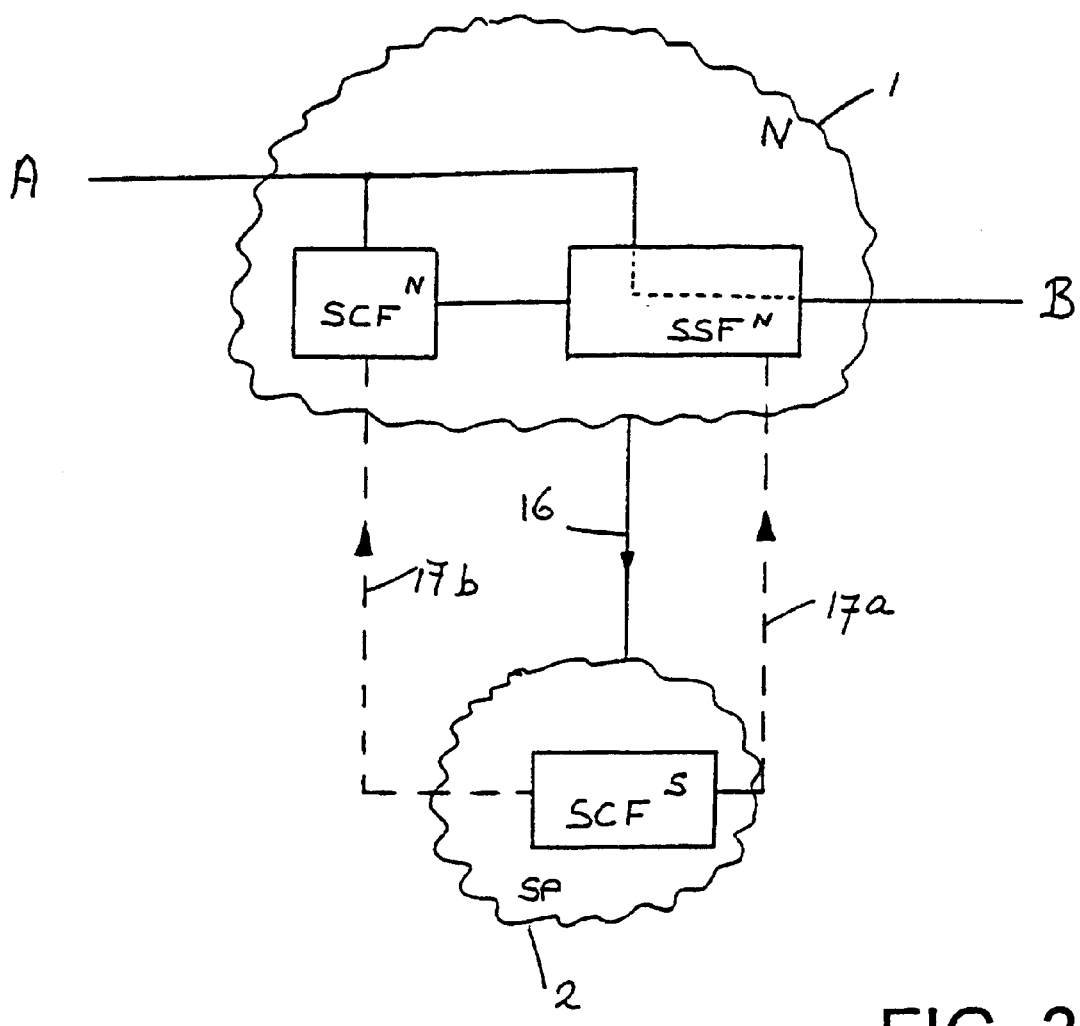
Figure 4:
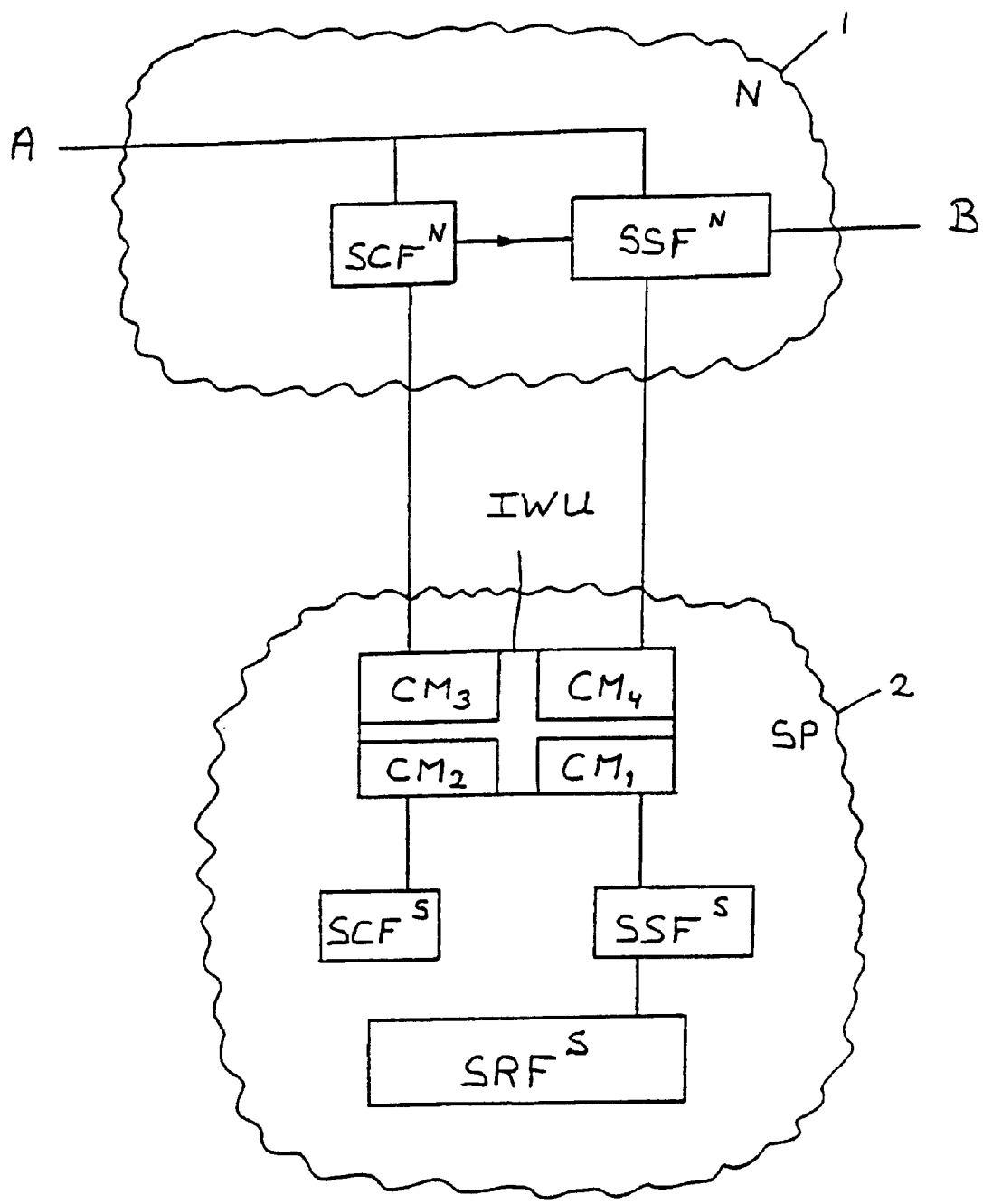
Figure 5:
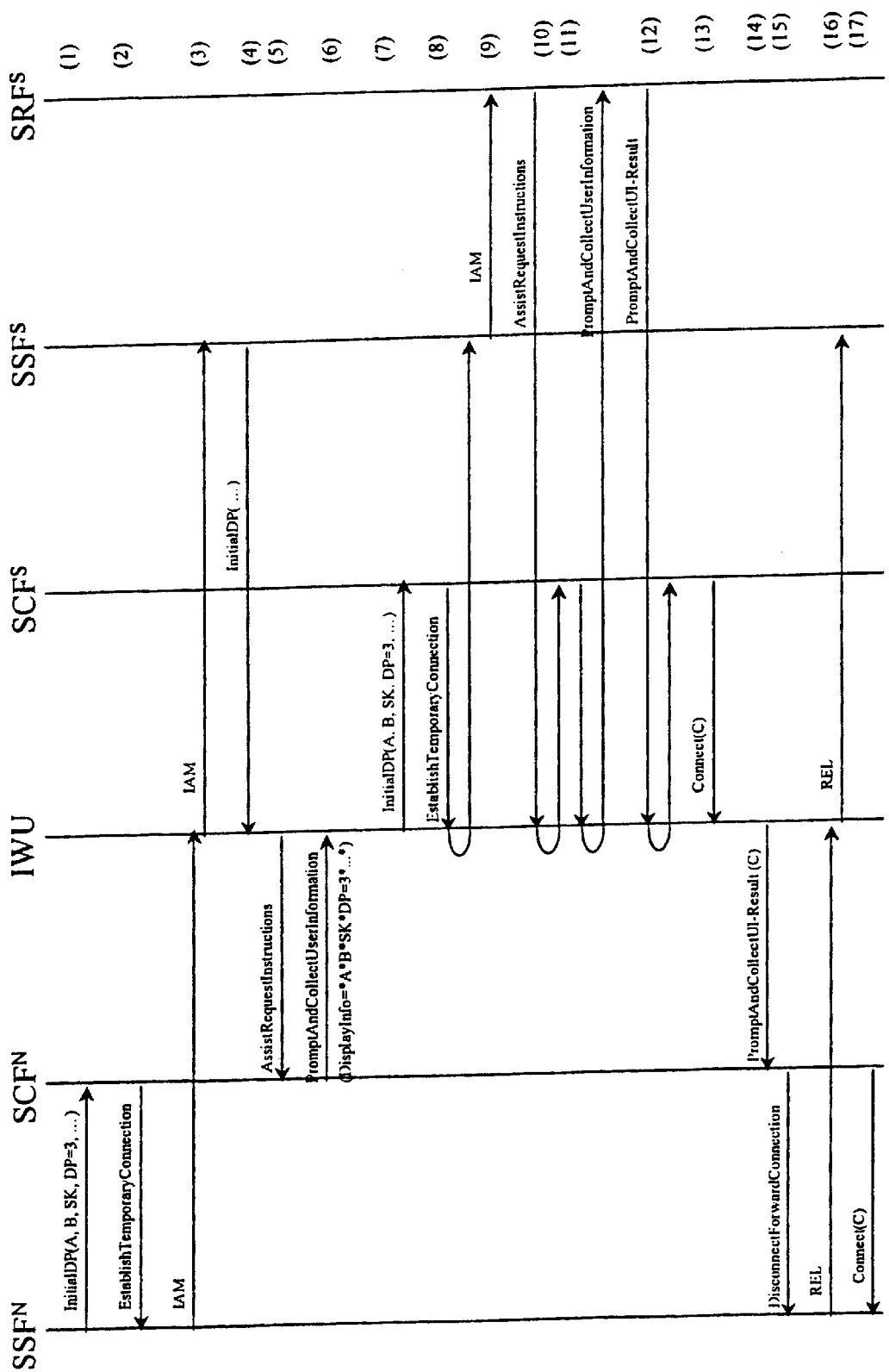
Figure 6:
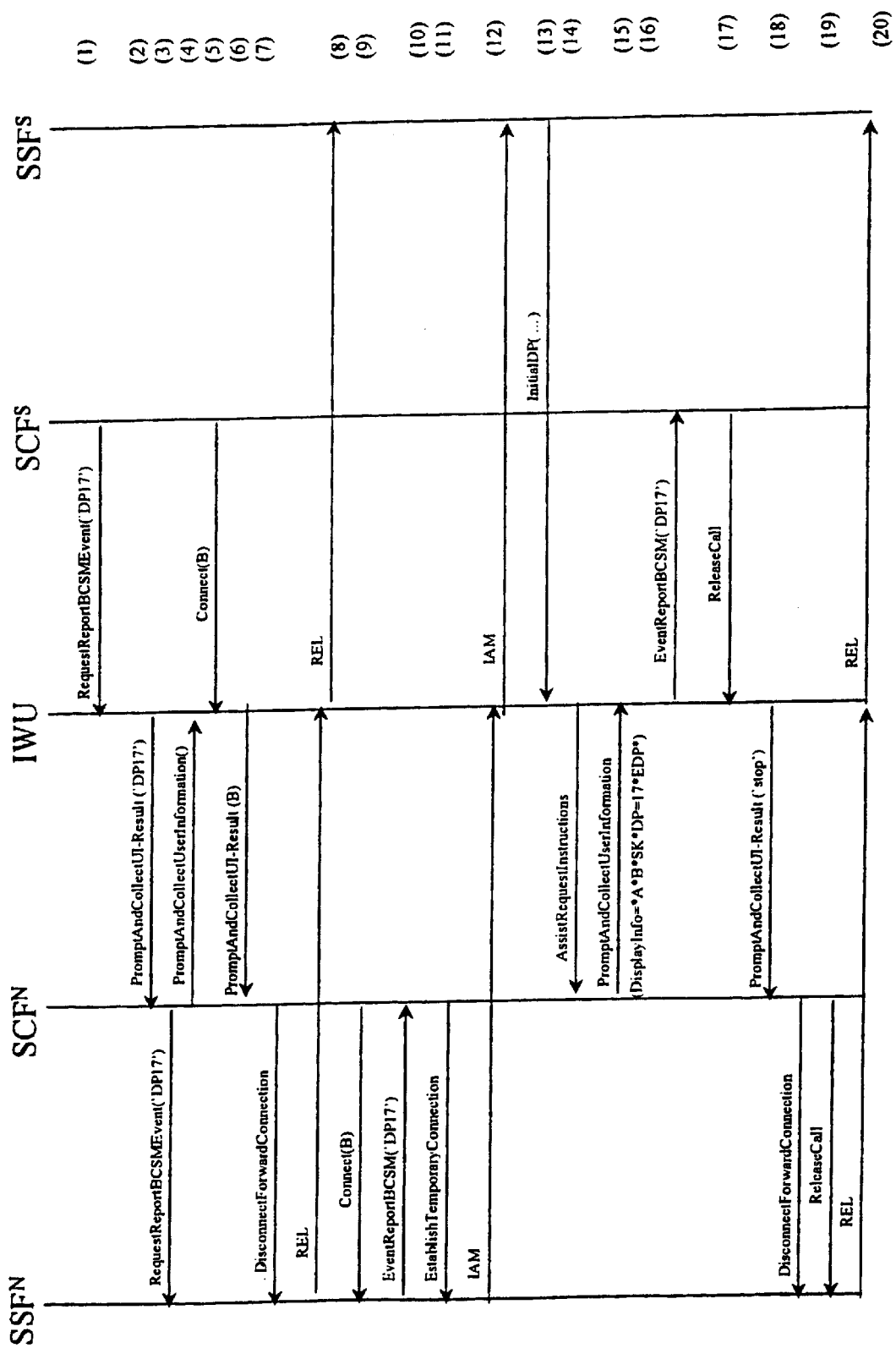

More in particular, the present invention is related to an infrastructure for telephony, for which reason the present invention will be explained below specifically for this exemplary embodiment with reference to the drawing, in which equal reference signs denote equal or similar parts, and in which:

FIGS. 1 to 3 inclusive schematically illustrate communication infrastructures according to the prior art;

FIG. 4 schematically illustrates a communication infrastructure according to the present invention;

FIGS. 5 and 6 are flowcharts which illustrate a sequence of communication in the communication infrastructure according to the present invention.

In the discussion below use will be made of concepts and abbreviations which are customary in this field; for a better understanding of these concepts and abbreviations, reference is made to the following publicly available publications:

1) Terms and Definitions, Abbreviations and Acronyms— Recommendations on Means of Expression (Series B), Blue Book Volume I, Fascicle I.3, ITU-T, Geneva, 1988.
2) Intelligent Network (IN); Intelligent Network Capability Set 1 (CS1); Core Intelligent Network Application Protocol (INAP); Part 1: Protocol Specification, ETSI, ETS 300 374-1, September 1994
3) Intelligent Network (IN); Interface Recommendation for Intelligent Network CS-1, ITU-T, Recommendation Q.1218, October 1995.
4) Intelligent Network (IN); Intelligent Network Application Protocol (INAP); Capability Set 2 (CS2); Part 1: Protocol Specification, ETSI, draft EN 301 140-1 V1.1.1, March 1998.
5) Intelligent Network (IN); Interface Recommendation for Intelligent Network CS-2, ITU-T, Draft Recommendation Q. 1228, April 1997.

FIG. 1 is a functional block diagram which schematically illustrates a conventional network 1 for telephony. Such a network, which is known in the prior art, has many connection points at which users or subscribers can be connected. At a first connection 11, a first subscriber A is connected to the network, and at a second connection 12 a second subscriber B is connected to the network. At the request of the first or calling subscriber A, a connection is established between said first subscriber A and the second or called subscriber B if certain conditions have been satisfied. Said network 1 thereto comprises switching means 20 for establishing a connection between a calling subscriber and a called subscriber, as well as control means 21 for controlling said switching means 20. The first connection 11 is connected to an input of the switching means 20 and to an input of the control means 21. The first subscriber A transmits a request to said control means 21 (for example by entering the desired subscriber number), and the control means 21 examine the validity of the request and, upon proven validity, instruct the switching means 20 to establish a connection between A and B.

The infrastructure illustrated in FIG. 1 is the classical infrastructure, which consists exclusively of the said network, and in which the facilities offered to the users are dependent only upon decisions of the network operator. A more recent development of an infrastructure is illustrated in FIG. 2. In this case, at a connection 13, a service platform 2, of which the owner is in general denoted by the term "service provider", is connected to said network 1 in a manner which is similar to the manner in which a subscriber is connected to said network 1. The service provider, who usually not the same as the network operator, offers extra services to the subscribers of said network 1 by means of said service platform 2.

Such an extra service, for example, is speech recognition. The present invention shall be explained more specifically below for this exemplary embodiment, but it shall be clear that the present invention is equally applicable for other services.

The calling subscriber A is first connected to the service platform 2, so that the calling subscriber A can supply his spoken command, of the type "connect me to B", to said service platform 2. Said service platform 2 can interpret the received command, and reconnects the calling subscriber A to said network 1, transmitting an accompanying understandable command for said network 1 (a translation, as it were, of the spoken command of said calling subscriber A) to establish the desired connection with the called subscriber B.

A disadvantage of the implementation illustrated in FIG. 2 is that the actual connection between the two subscribers A and B runs via said service platform, as indicated by the loop 14. This means that, during the full length of the call, not only a connection between the calling subscriber A and said network 1, as well as a connection between said network 1 and the called subscriber B, is engaged, but that two connections (forward and back, mutually connected via said loop 14) between said network 1 and said service platform 2 are also engaged. This makes this infrastructure relatively expensive, and entails a substantial impairment of the service provider's capacity. After all, as long as the established connection continues to exist, the service provider is unable to use the two connections between network 1 and the service platform 2, as well as the components involved in the loop connection 14 within said service platform 2, for other purposes, while on the other hand the aid of the service provider is actually only required for establishing the connection and not for maintaining the connection.

There are also systems in the prior art in which the connection between the two subscribers A and B runs via said network 1 only, and not via said service platform 2. Two such existing structures will be explained below with reference to FIG. 3.

For the sake of convenience, the term "service provider (SP)" will also be used below instead of the term "service platform". Further, a component which is present in the network will be denoted by a name or abbreviation with the addition of the exponent N; a service provider component which is present will be denoted in a similar manner by an exponent S.

FIG. 3, like FIG. 4, is a functional diagram illustrating the sequence of and the transition to various functions of the network N and the service provider SP. The network 1 has a service switching function $SSF^N$ and a service control function $SCF^N$ for controlling the service switching function $SSF^N$. Said service provider 2 has at least one $SCF^S$. In the existing structure as illustrated in FIG. 3, the voice command of the calling subscriber A is transferred to the service provider SP in a similar manner as described above with respect to FIG. 2. Within the service provider SP, the voice commands of the calling subscriber A are received, interpreted and assessed. On the basis of said commands the service provider SP subsequently issues a command to certain parts within the network 1, whereby the connection between the two subscribers A and B is directly established. Thereafter, a connection between the network 1 and the service provider SP for maintaining the voice connection between the two subscribers A and B is no longer required, so that the capacities of the service provider SP can be used for building up a following call and/or supplying a subsequent service.

A first variant of this prior art system is implemented in such a manner that an $SCF^S$ can issue a control command to an $SSF^N$ (17a) directly. This has the substantial disadvantage of the network operator losing control, at any rate in part, over his network, so that he can no longer guarantee the integrity of his network.

A second variant of the above-mentioned system is implemented in such a manner that an $SCF^S$ transmits an instruction to an $SCF^N$ (17b), which subsequently controls the switching function $SSF^N$. With respect to the first-mentioned variant this system admittedly has the advantage that the integrity of said network 1 is better guaranteed, since the switching function $SSF^n$ is controlled only on the basis of commands which are generated within the network, namely by the $SCF^N$, and in principle the network operator himself can determine whether "unwarranted" control commands are issued to the $SSF^N$. A disadvantage, however, is that at the $SCF^N$ information must be present regarding the privileges of the $SCF^S$, and that the $SCF^N$ must fulfil a policing function to check commands originating from the $SCF^S$. It is further a disadvantage that this structure is rigid in the sense that if the service provider, for example, wishes to introduce a new service, this is only possible after consultation and agreement between the service provider and the network operator, since the introduction of a new service must be accompanied by new information being present at the $SCF^N$.

The present invention seeks to eliminate the above-mentioned disadvantages or at least alleviate them.

More in particular, the present invention seeks to provide an infrastructure for communication comprising a network with subscriber connections and a service provider connected to the network, in which on the one hand the integrity of the network is guaranteed but, on the other hand, the service provider has the possibility of adding or changing services without having to consult with the network operator.

According to an important aspect of the present invention a generic set of instructions is present at the $SCF^N$, and the service provider SP is set up to function as a Special Resource Point SRP.

FIG. 4 diagrammatically shows a functional block diagram of the infrastructure according to the present invention. The service provider SP comprises an inter-working unit IWU, coupling the service provider SP and the network N. More in particular, the IWU within the domain of the service provider is coupled to an $SSF^S$ and an $SCF^S$, while the IWU is externally coupled to an $SSF^N$ and an $SCF^N$ of the network. More in particular, the IWU comprises:
a first functional interface $CM_1$, between the IWU and an $SSF^S$; a second functional interface $CM_2$ between the IWU and an $SCF^S$; a third functional interface $CM_3$ between the IWU and an $SCF^N$; a fourth functional interface $CM_4$ between the IWU and an $SSF^N$.

With respect to the term "functional interface" it is remarked that this refers to the interaction between different functions. For example, it may refer to a communication protocol.

It is further remarked that the communication within the network N as well as the communication from and to the network N takes place via protocols which are associated with an Intelligent Network as defined in the publications referred to in the introduction. The manner in which the various parts within the domain of the service provider SP communicate with each other, however, is unrestricted. The service provider SP can choose to set up his own domain as an Intelligent Network, and to use the related standardised protocols, but said service provider SP cay also choose to use another structure and/or other protocols. As shall become clear from the description below, the choice of the service provider SP in this regard has no influence on the functioning of the present invention. Although the terminology SCF, SSF, SRF etc. in the publications referred to in the introduction is defined in conjunction with an Intelligent Network and the related standardised protocols, the terminology $SCF^S$, $SSF^S$, $SRF^S$ etc. will be used below to refer both to the functions defined in the said publications and to functions similar thereto, and the interfacing between said functions shall not be limited to the protocols defined in said publications.

The first functional interface $CM_1$ is such that, in the communication with the $SSF^S$, the IWU behaves as an SCF. Seen from the $SSF^S$, the IWU thus has, as it were, an SCF face.

The second functional interface $CM_2$ is such that, in the communication with the $SCF^S$, the IWU behaves as an SSF; seen from the $SCF^S$ the IWU thus has, as it were, an SSF face.

It is remarked that, in the example described here, the $SSF^S$ has a transfer function for the exchange of messages between the $SCF^S$ and the $SRF^S$. The present invention, however, is not restricted to such an implementation: for the exchange of messages between the $SCF^S$ and the $SRF^S$ other implementations are also possible which, however, will not be explicitly described here.

The third and fourth functional interfaces $CM_3$ and $CM_4$ of the IWU are such that, in the communication with the network N, the IWU behaves as an SRP; seen from the network the IWU of the service provider thus has, as it were, an SRP face. Since special resource points SRP are known per se, the functioning thereof will not be further explained here.

A first advantage of the infrastructure proposed by the present invention is that the functions $SCF^S$ and $SSF^S$ of the service provider SP are not required to be standard functions, and that the communication between these functions and the IWU may run via an arbitrary protocol which can be defined by the service provider himself; in this regard it is only important that the functions within the service provider "understand each other". As far as the communication between the network N and the service provider is concerned, the IWU functions as an interpreter, in such a manner that the communication between the IWU and the other parts of the service provider takes place via the said arbitrary protocol, while the communication between the IWU and the network is carried out on the basis of pre-established standard protocols. In this regard it is remarked that, after suitable processing, the IWU in fact forwards each arriving message, and that no memory is required in the IWU to store the status of calls. This implies that the IWU can be a relatively cheap unit.

In the $SCF^N$, a generic service logic functions which is independent of the service(s) provided by the service provider SP, which forms part of the agreements between the network operator and the service-provider, and which is controlled by the network operator. The IWU and thereby the $SCF^S$, can only use pre-determined generic instructions which form part of said generic service logic; the generic instructions from said generic service logic which are available to the IWU are also controlled by the network operator. For this reason it is not possible, whether on purpose or not, to issue erroneous or undesired instructions from the service provider to the network, so that the integrity of the network is guaranteed.

Although the said generic instructions are pre-determined by the network operator and are made available to the service provider, the service provider is not obliged to actually use all said instructions. The set of generic instructions is available to the service provider and the service provider can make a selection from it when establishing a service package. Therefore, by simply using more instructions from the set of generic instructions, the service provider can change his service package in a simple manner without the necessity of consulting with the network operator.

By way of example, the messages exchanged between the various parts of the network and of the service provider will now be explained with reference to the diagram of FIG. 5. This example is related to the service "dialling by means of voice control".

In a first step, the $SSF^N$ detects the occurrence of a triggering event, for example the reception of an initiating signal from the calling subscriber A. The $SSF^N$ then transmits an InitialDP message to the $SCF^N$.

In a second step, the $SCF^N$ issues a command to the $SSF^N$ to establish a temporary connection with the IWU (via the functional interface $CM_4$ thereof), as if it were an SRF.

In a third step, the $SSF^N$ establishes a temporary connection with the IWU via functional interface $CM_4$, after which the IWU transmits a setup message to the $SSF^S$ via functional interface $CM_1$.

In a fourth step, the $SSF^S$ responds by transmitting an InitialDP message to the IWU via functional interface $CM_1$. In this case the parameters present in the InitialDP message are not significant, since said message serves only for stopping the call setup process in the $SSF^S$ in order to make the $SSF^S$ wait for instructions from the $SCF^S$.

In a fifth step the IWU, via functional interface $CM_3$, requests instructions from the $SCF^N$.

The $SCF^N$ then, in a sixth step, issues instructions to the IWU. This may take place, for example, by means of the DisplayInformation parameter in a PromptAndCollectUserInformation message. The information in said parameter is an IA5 string, of which the contents conform to previously reached agreements between the network operator and the service provider. In this example the information comprises a combination of, inter alia, the telephone number of the calling subscriber A, the telephone number of the called subscriber B, and command-related information such as ServiceKey, DetectionPoint, and so on. It concerns the information which the $SCF^N$ received from the $SSF^N$ with the InitialDP message in the first step.

In a seventh step, the IWU, via functional interface $CM_2$, transmits an InitialDP message to the $SCF^S$, after reconstructing this message from the information received in the PromptAndCollectUserInformation message.

In an eighth step, the $SCF^S$ issues a command to the $SSF^S$ to establish a temporary connection with a section of the service provider which provides the speech recognition functionality, said section being denoted by the term Special Resource Function $SRF^S$. Said command can be transmitted directly to the $SSF^S$ by the $SCF^S$, or, as illustrated in FIG. 4, can be transmitted by the $SCF^S$ to the IWU (via functional interface $CM_2$) and then forwarded by the IWU (via functional interface $CM_1$) to the $SSF^S$.

In a ninth step, the $SSF^S$ establishes a temporary connection with the $SRF^S$. At this time a connection has in fact been established between the calling subscriber A and the special service "speech recognition" offered by the service provider SP.

In a tenth step, the $SRF^S$ transmits an instruction request to the $SCF^S$. Said $SRF^S$ can transmit said instruction request directly to the $SCF^S$ or, as illustrated in FIG. 4, by transmitting said instruction request to the IWU (via the $SSF^S$ and via functional interface $CM_1$) after which said instruction request is forwarded by the IWU (via functional interface $CM_2$) to said $SCF^S$.

In an eleventh step the $SCF^S$ transmits a PromptAndCollectUserInformation message to the $SRF^S$. In a similar manner as described for the tenth step, the $SCF^S$ transmits this message through mediation of the IWU, that is to say via functional interface $CM_2$, functional interface $CM_1$ and the $SSF^S$. The $SRF^S$ is hereby instructed to extract the call destination number (that is to say the telephone number of the called subscriber B) from the signal received from the calling subscriber A (that is to say: the voice command)

In a twelfth step, the $SRF^S$ extracts the call destination number from the signal received from the calling subscriber A, translates this into a format which can be understood by network N, and transmits this information through mediation of the IWU to the $SCF^S$.

In a thirteenth step the $SCF^S$, via functional interface $CM_2$, transmits a request for connection to the call destination number to the IWU.

In a fourteenth step, the IWU translates this request into a PromptAndCollectUserInformationResult message which, via functional interface $CM_3$, is transmitted to the $SCF^N$ of the network N as a reply to the PromptAndCollectUserInformation message which was sent to the IWU by the $SCF^N$ in the sixth step. The ReceivedInformationArg parameter of the PromptAndCollectUserInformationResult message then contains the digits of the call destination number.

In a fifteenth step, the $SCF^N$ issues a command to the $SSF^N$ to drop the connection with the IWU of the service provider.

In a sixteenth step, the $SSF^N$ transmits an ISUP REL message to the IWU in order to drop the connection between the $SSF^N$ and the IWU. The IWU forwards said message to the $SSF^S$ in order to drop the connection between the $SSF^S$ and the IWU.

In a seventeenth step, the $SCF^N$ issues a command to the $SSF^N$ to establish a connection with the call destination number, in order to establish the connection between A and B.

It will be clear that the services of the service provider are now no longer required for establishing and maintaining the connection between A and B.

In the example discussed, the temporary connection between the $SSF^N$ and the $SRF^S$ of the service provider was dropped directly after the call destination number became known at the $SCF^N$. It is also possible, however, that the $SSF^N$ received the command from the $SCF^N$ to monitor the occurrence of other events, in which case the connection can be maintained longer.

From the example described above it will be clear to those skilled in the art that the result of the IWU proposed by the present invention is that the integrity of the network N is guaranteed, since the communication between the IWU and the $SCF^N$ of the network N can take place only via predetermined messages. It will be explained below, with reference to the diagram of FIG. 6, how a service provider can extend his service program without further consultation with the network operator by a set of predetermined messages being available to the service provider at the $SCF^N$. In this second example, the service provider will set an Event Detection Point at the triggering point T_Disconnect in the $SSF^N$ (this is DP 17 in IN CS1). It is assumed that there is already a relationship between the $SCF^N$ and the IWU of the service provider.

In a first step, the $SCF^S$ of the service provider S transmits a RequestReportBCSMEvent message to the IWU via functional interface $CM_2$.

In a second step, the received message is translated by the IWU into a PromptAndCollectUserInformationResult message, the request for activation of the DP becoming included in the ReceivedInformationArg parameter in encoded form. By means of mutual agreements, the manner of encoding is known beforehand by both the service provider and the network-operator. The request is transmitted to the $SCF^N$ by the IWU via functional interface $CM_3$. It is remarked in this regard that the service provider and the network operator only need to reach agreement concerning the manner of encoding of certain requests, but at the time the service provider places a request, as, in this case, the DP request, negotiation regarding permitting or not permitting said request is not required: in principle, the DP facility is already available for the service provider, and he can switch this facility on or off at his own discretion.

In a third step, the $SCF^N$ translates the received request into a RequestReportBCSMEvent message again and transmits this message to the $SSF^N$.

In a fourth step, the $SCF^N$ subsequently transmits a new PromptAndCollectUserInformation message to the IWU, in order to signal to the $SCF^S$, via the IWU, that the $SCF^N$ is ready to receive further commands.

In a fifth step, the $SCF^S$ transmits a Connect message to the IWU, via functional interface $CM_2$, in order to establish a connection with a subscriber B.

In a sixth step, the received message is translated by the IWU into a PromptAndCollectUserInformationResult message, the telephone number of B becoming included in encoded form in the ReceivedInformationArg parameter. The request is transmitted to the $SCF^N$ by the IWU via functional interface $CM_3$.

In a seventh step, the $SCF^N$ issues a command to the $SSF^N$, to drop the connection with the service provider, but the $SCF^S$ of the service provider is still active and awaiting further instructions since DPs are still in effect.

In an eighth step, the $SSF^N$ transmits an ISUP_REL message to the IWU, via functional interface $CM_4$, said message being forwarded by the IWU via functional interface $CM_1$ to the $SSF^S$, so that the service provider is disconnected from the network.

In a ninth step, the $SCF^N$ issues a command to the $SSF^N$ to establish a connection with the subscriber B.

When said subscriber B then, at an arbitrary later time, drops the connection, the activated state of DP 17 results in an EventReportBCSMEvent message which the $SSF^N$, in a tenth step, transmits to the $SCF^N$.

In an eleventh step, the $SCF^N$ issues a command to the $SSF^N$ to establish a temporary connection with the service provider.

In a twelfth step the $SSF^S$, via functional interface $CM_4$, establishes a temporary connection with the IWU, after which the IWU, via functional interface $CM_1$, transmits a setup message to the $SSF^S$.

In a thirteenth step the $SSF^S$ responds by transmitting, via functional interface $CM_1$, an InitialDP message to the IWU. In this case only a few of the parameters present in the InitialDP message are relevant, such as the number of the calling subscriber A or another reference.

In a fourteenth step the IWU, via functional interface $CM_3$, requests instructions from the $SCF^N$.

The $SCF^N$, in a fifteenth step, then issues instructions to the IWU. This, for example, can take place by means of the DisplayInformation parameter in a PromptAndCollectUserInformation message. The information in this parameter is an IA5 string, of which the contents conform to previously reached agreements between the network operator and the service provider. In this example the information comprises a combination of, inter alia, the telephone number of the calling subscriber A, the telephone number of the called subscriber B, and command-related information such as ServiceKey, DetectionPoint, and so on. It concerns the information which the $SCF^N$ received from $SCF^N$ the with the EventReportBCSMEvent message in the tenth step.

In a sixteenth step the IWU, via functional interface $CM_2$, transmits an EventReportBCSMEvent message to the $SCF^S$, after reconstructing said message from the information received in the PromptAndCollectUserInformation message.

Assuming that the DP was only a notification trigger, the $SCF^S$ wants now to drop the connection, to which end the $SCF^S$, in a seventeenth step, transmits a ReleaseCall message to the IWU via functional interface $CM_2$.

In an eighteenth step, the received message is translated by the IWU into a PromptAndCollectUserInformationResult message, the stop signal being included in encoded form in the ReceivedInformationArg parameter. The request is transmitted by the IWU, via functional interface $CM_3$, to the $SCF^N$. The encoding form again is agreed upon beforehand by the service provider and the network operator, as previously discussed.

In a nineteenth step, the $SCF^N$ translates this instruction and transmits a DisconnectForwardConnection message and/or a ReleaseCall message to the $SSF^N$.

In a twentieth step, the connection of the $SSF^N$ with the IWU and the $SSF^S$ is dropped.

It will be clear to those skilled in the art that the scope of the present invention is not limited to the examples discussed above, but that various changes and modifications thereof are possible without deviating from the scope of the invention as defined in the appended Claims. In this regard, for example, it has been assumed in the discussion of the examples that the service provider has an Intelligent Network (standardised IN structure). Within the scope of the present invention, however, it is also possible that the service provider has an IN-like structure, for example a network in which the communication protocols deviate from the international standard. Further, it is for example possible that the third and fourth functional interfaces are integrated into a common functional interface.

What is claimed is:

1. An infrastructure for data transmission, comprising:
    a network (N) with connection points (11, 12) for subscribers (A, B);
    a service provider (SP) coupled to the network (N); in which the network (N) comprises a service switching function ($SSF^N$) as well as a service control function ($SCF^N$) for controlling the service switching function ($SSF^N$);
    in which the service provider (SP) comprises a service switching function ($SSF^S$) as well as a service control function ($SCF^S$) for controlling the service switching function ($SSF^S$);

in which the service control function ($SCF^N$) of the network (N) has at its disposal a set of generic instructions which are available to the service control function ($SCF^S$) of the service provider (SP);

in which the service provider (SP) comprises an inter-working unit (IWU), said inter-working unit (IWU):

being connected, via a first functional interface ($CM_1$), to a service switching function ($SSF^S$) of the service provider (SP), said first functional interface ($CM_1$) being such that the inter-working unit (IWU), in the communication with the service switching function ($SSF^S$) of the service provider (SP), behaves as service control function ($SCF^S$);

being connected, via a second functional interface ($CM_2$), to a service control function ($SCF^S$) of the service provider (SP), said second functional interface ($CM_2$) being such that the inter-working unit (IWU), in the communication with the service control function ($SCF^S$) of the service provider (SP), behaves as service switching function;

being connected, via a third functional interface ($CM_3$), to a service control function ($SCF^N$) of the network, and being connected, via a fourth functional interface ($CM_4$), to a service switching function ($SSF^N$) of the network, said third and fourth functional interfaces ($CM_3$, $CM_4$) being such that the inter-working unit (IWU), in the communication with the service control function ($SCF^N$) and the service switching function ($SSF^N$), behaves as special resource function (SRF).

2. An infrastructure according to claim 1, in which the service switching function ($SSF^S$) of the service provider (SP) is arranged to transmit messages, destined for the service control function ($SCF^S$) of the service provider (SP), via the first functional interface ($CM_1$) to the inter-working unit (IWU), in which the inter-working unit (IWU) is arranged to forward said received messages, possibly after a suitable conversion, via the second functional interface ($CM_2$) to the service control function ($SCF^S$).

3. An infrastructure according to claim 1, in which the service control function ($SCF^S$) of the service provider (SP) is arranged to transmit commands, destined for the service switching function ($SSF^S$) of the service provider (SP), via the second functional interface ($CM_2$) to the inter-working unit (IWU), in which the inter-working unit (IWU) is arranged to forward said received commands, possibly after a suitable conversion, via the first functional interface ($CM_1$) to the service switching function ($SSF^S$).

4. An infrastructure according to claim 1, in which the service control function ($SCF^S$) of the service provider (SP) is arranged to transmit commands, destined for the service switching function ($SSF^N$) of the network (N), via the second functional interface ($CM_2$), to the inter-working unit (IWU), in which the inter-working unit (IWU) is arranged to forward said received commands, possibly after a suitable conversion, via the third functional interface ($CM_3$) to the service control function ($SCF^N$) of the network (N), and in which the service control function ($SCF^N$) of the network (N) is arranged to translate the received information to a suitable command for the service switching function ($SSF^N$) of the network (N) and to transmit said command to the service switching function ($SSF^N$) of the network.

5. An infrastructure according to claim 1, in which the service control function ($SCF^N$) of the network (N) is arranged to issue a command, upon reception of a certain triggering signal from a calling subscriber (A), to the service switching function ($SSF^N$) of the network (N) to establish a temporary connection with the inter-working unit (IWU) of the service provider (SP) via the fourth functional interface ($CM_4$); and in which the service control function ($SCF^N$) of the network (N) is arranged to transmit an instruction, after establishing said temporary connection and after the reception of a response from the service control function ($SCF^S$) of the service provider (SP), to the service control function ($SCF^S$) of the service provider (SP).

6. An infrastructure according to claim 5, in which the service control function ($SCF^N$) of the network (N) is arranged to interpret a reply, transmitted by the service control function ($SCF^S$) of the service provider (SP) in response to said instruction either as the telephone number of a called subscriber, as a request for activating one or more DetectionPoints, or as a stop signal.

7. An infrastructure according to claim 6, in which the service control function ($SCF^N$) of the network (N) is arranged to, if the said reply of the service control function ($SCF^S$) of the service provider (SP) is interpreted as a stop signal, issue a command to the service switching function ($SSF^N$) of the network (N) to drop the connection with the inter-working unit (IWU) of the service provider (SP) and to drop the connection with the calling subscriber (A).

8. An infrastructure according to claim 6, in which the service control function ($SCF^N$) of the network (N) is arranged to, if the said reply of the service control function ($SCF^S$) of the service provider (SP) is interpreted as the telephone number of a called subscriber (B) issue a command to the service switching function ($SSF^N$) of the network (N) to drop the connection with the inter-working unit (IWU) of the service provider (SP) and to establish a connection with the called subscriber (B).

9. An infrastructure according to claim 6, in which the service control function ($SCF^N$) of the network (N) is arranged to, if the said reply of the service control function ($SCF^S$) of the service provider (SP) is interpreted as a request for activating one or more DetectionPoints, issue a command to the service switching function ($SSF^N$) of the network (N) to switch on the related DetectionPoints and transmit a further instruction to the service control function ($SCF^S$) of the service provider (SP).

* * * * *